United States Patent [19]

Paterlini

[11] Patent Number: 4,660,900
[45] Date of Patent: Apr. 28, 1987

[54] SUPPORT FOR CAR RADIOS, CASSETTE PLAYERS, TUNERS AND SIMILAR EQUIPMENT

[75] Inventor: Elio Paterlini, Reggio Emilia, Italy

[73] Assignee: Autosonil S.p.A., Reggio Emilia, Italy

[21] Appl. No.: 736,646

[22] Filed: May 21, 1985

[30] Foreign Application Priority Data

Jun. 1, 1984 [IT] Italy .............................. 34868/84[U]

[51] Int. Cl.⁴ ............................................. A47B 81/03
[52] U.S. Cl. ..................................... 312/7.1; 312/319
[58] Field of Search ...................... 248/27.1, 551, 552, 248/553; 312/7.1, 12, 319

[56] References Cited

U.S. PATENT DOCUMENTS

| | | | |
|---|---|---|---|
| 3,592,521 | 7/1971 | Cox | 312/319 |
| 4,005,367 | 1/1977 | Dano | 312/7.1 |
| 4,155,610 | 5/1979 | Englund | 312/319 |
| 4,159,655 | 5/1985 | Kamperman | 312/12 |

Primary Examiner—Kenneth J. Dorner
Assistant Examiner—Joseph Falk
Attorney, Agent, or Firm—Bucknam and Archer

[57] ABSTRACT

Support for car radios, casette players, tuners and similar equipment suited to being firmly mounted on the dash-boards of vehicles, boats and similar and to completely hide the equipment fitted, including a box-like body complete with means for anchoring to the dashboard seat and two sliding side guides, a front cover hinged to the front edge of the said box-like body; a support for the equipment to be installed which slides in the side guides a spring and a trip engaging device both arranged between the rear sides of the box-like body and of the sliding support respectively.

5 Claims, 5 Drawing Figures

SUPPORT FOR CAR RADIOS, CASSETTE PLAYERS, TUNERS AND SIMILAR EQUIPMENT

BACKGROUND OF THE INVENTION

1. Field of the Invention

This invention refers to a support for car-radios, cassette players, tuners and similar equipment. More in particular this invention refers to a support for car-radios, cassette players, tuners and similar equipment, suited to being firmly mounted on the dash-boards of vehicles, boats and similar and to completely hide the installed equipment.

2. Description of the Prior Art

As is known, supports for car-radios, cassette players and tuners to be mounted on the dash-boards of vehicles, boats and the like generally consist of a fixed box structure, which may be anchored within special seats made on the vehicle dash-boards and by a mobile support structure on which the equipment to be installed is applied.

Anchoring devices which enable the box-like structure to be fixed to the dash-board seat in an easy, rapid and firm manner are also known.

The main drawback presented by the known supports is that they do not cover the front part of the installed equipment so that the latter may be seen from outside and can be subject to theft, particularly when the vehicle is left unattended.

SUMMARY OF THE INVENTION

The object of this invention is to provide a support for car-radios, cassette players, tuners and similar equipment, suited to being firmly mounted on the dash-boards of vehicles, boats and the like without the above mentioned drawback.

More in particular, the object of this invention is to provide a support as detailed above which besides being economical and easy and quick to mount, makes it possible to completely hide the equipment installed and efficiently camouflage its presence.

According to this invention, these and other aims are achieved by a support for car-radios, cassette players, tuners and the like equipment, suited to being firmly mounted on the dashboards of vehicles, boats and similar, consisting of:

a box-like body, open at the front and fitted with anchoring means to the dash-board seat, sliding guides and a bottom end to which an engaging means protrudes towards the inside;

a mobile strucure supporting the equipment to be installed and made up of a frame fitted with slides and a bottom end on the external surface of which a trip hitch is fixed;

a front cover hinged to the front edge of the box-like body and pivoted on the slides and an elastic means arranged between the two sides of the box-like body and the mobile structure respectively.

The front cover, hinged to the edge of the box-like body is fitted with two symmetrical side lugs pivoted to the respective side slides of the mobile structure via levers. Hence, it is necessary to open the front cover, which operates like a bascule bridge for forward sliding and to close the cover for backward sliding.

When the mobile structure is inserted in the box-like body the coupling means of the box-like body engages under pressure in the trip hitch of the mobile structure, while the elastic means is compressed between the two walls. The front cover is completely closed in this position. Release of the coupling means is achieved by simply exerting pressure on the front cover.

After release the spring expands and pushes the mobile structure outwards; the front cover simultaneously opens and tilts downwards, leaving the installed equipment projecting from the opening of the box-like body.

The depth of the box-like body may be increased by introducing a spacer in the front part. For greater security a thief alarm of a known type may be inserted between the two bottom ends of the box-like body and the mobile structure.

BRIEF DESCRIPTION OF THE DRAWINGS

The structural and functional characteristics of this support can be understood better from the description that follows, wherein reference is made to the figures that represent a preferred, exemplificative, but non-limitative embodiment of this invention and where.

DESCRIPTION OF THE PREFERRED EMBODIMENT

Figure 1:
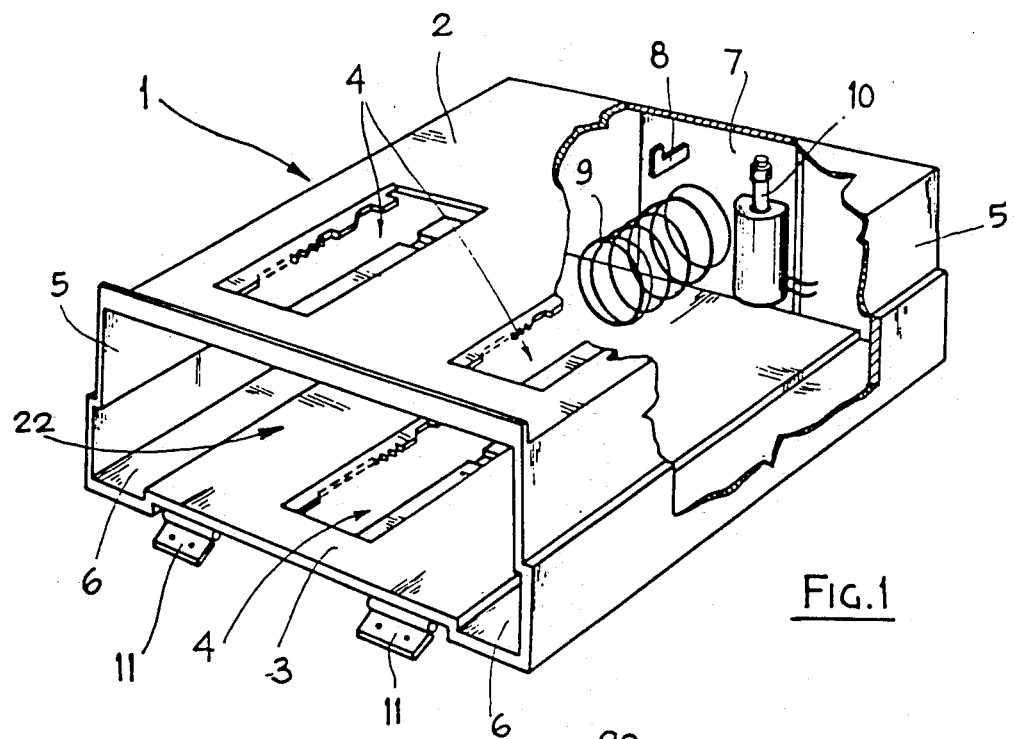
FIG. 1 represents a schematic, perspective, partially sectioned view of the fixed box structure.
Figure 2:
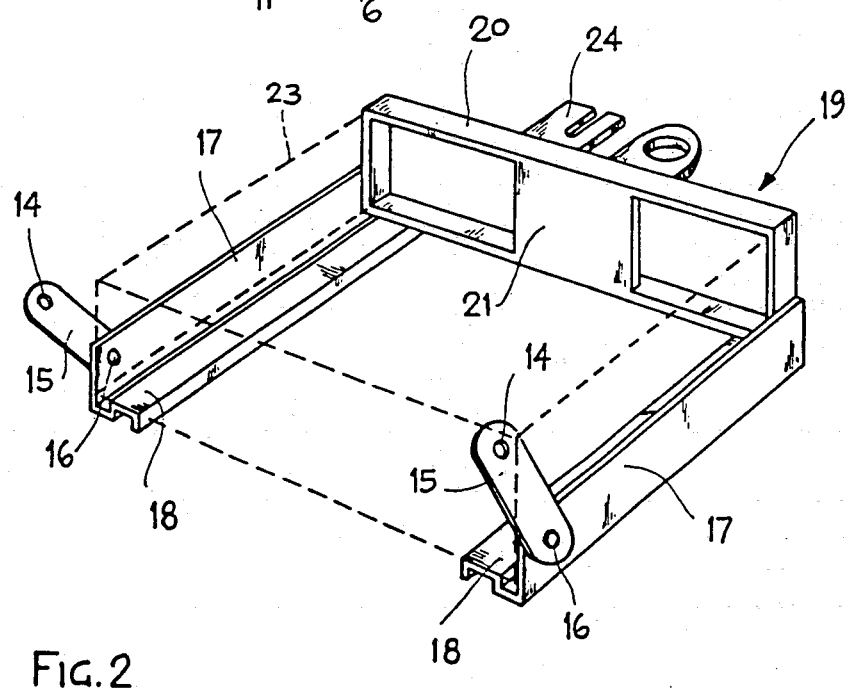
FIG. 2 represents a schematic, perspective view of the mobile support structure.
Figure 3:
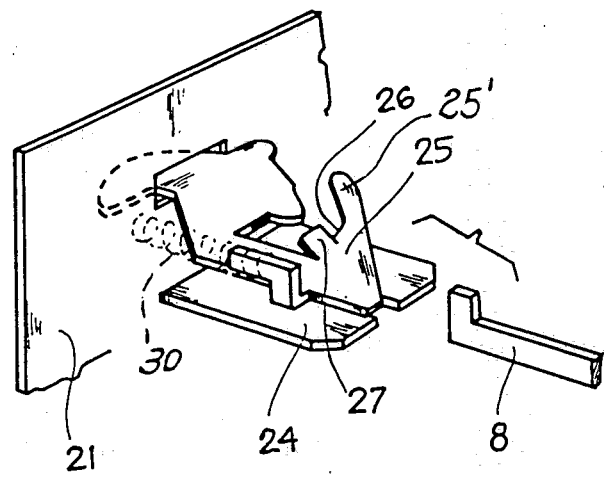
FIG. 3 represents a schematic view of the pressure type coupling and release device.
Figure 4:
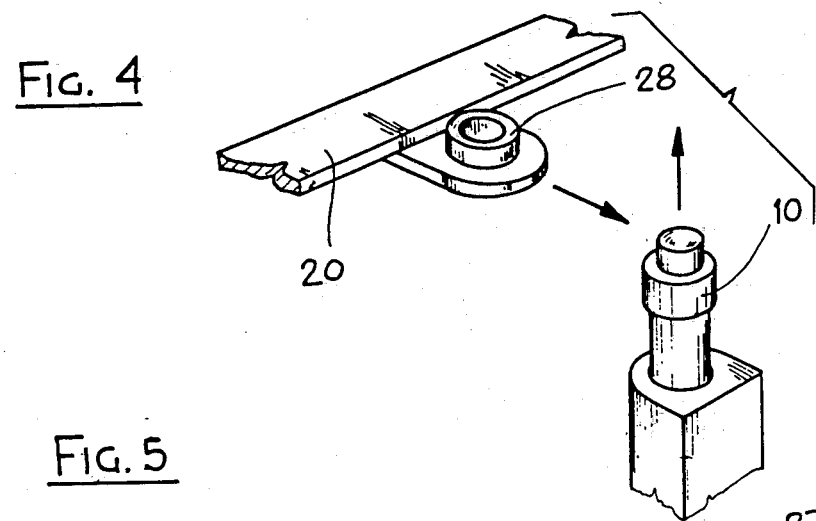
FIG. 4 represents a detail schematic view of the electromagnetic latch with the relative engaging device.

The figures illustrate a support for car-radios, cassette players, tuners and similar equipment consisting of a box-like body 1 where openings 4 have been made on the upper 2 and lower 3 sides, with profiled and toothed side edges, inside which an equal number of anchoring plates (not shown) of a known type are inserted.

The box-like body is shaped along the lower edges between the lower side 3 and the side walls 5 so as to form two longitudinal sliding guides 6 and a hook shaped body 8 protrudes internally on the bottom end.

Figure 5:
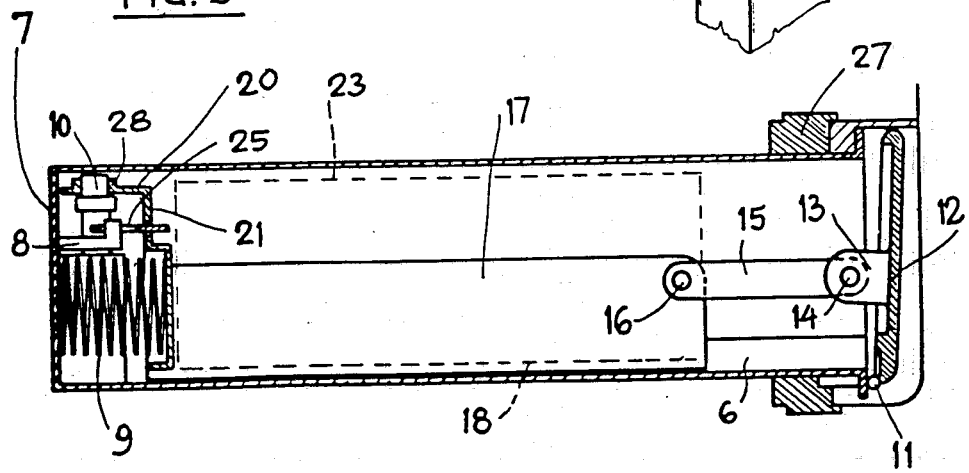
FIG. 5 represents a schematic view of the longitudinal cross-section of the car-radio support in the closed position.

In addition, the side 7 constitutes the supporting base for a return spring 9 and the support for an electromagnetic latch 10. The box-like body 1 is open on the front part 22 and two hinges 11 are fixed to the edge of the lower side 3 on which the front cover 12 is applied (see FIG. 5). The front cover 12 has two symmetrical side lugs 13, having two small tabs 15 pivoted on their free ends 14. The ends opposite the small tabs 15 are in turn pivoted at 16 on the side edges 17 of two slides 18, which slide in the longitudinal guides.

The slides 18, constitute the base of the mobile support structure 19 on which the car-radios, cassette players and similar equipment to be installed 23 are fixed. The slides 18 are fixed at the rear to a frame 20 in the central part of one side 21 which when in the operating position aligns itself along side 7 of the box-like body 1. Side 21 constitutes the second support base for the opposing spring 9.

The spring is arranged between the sides 7 and 21 and it is compressed between these sides when the mobile structure 19 is closed and engaged with the box-like structure 1; whereas the spring 9 expands and pushes the mobile structure 19 outwards when the said structure 19 is in the open and released condition.

Under these conditions, the mobile structure 19 protrudes from the front opening 22 of the box-like body 1, taking with it the equipment 23 installed thereon and forcing the front cover 12 to open up like a bascule bridge, thanks to the pushing action exerted by the side tabs 15. A hook shaped 8 alignment guide 24 and a trip hitch 25 of known type are applied on the rear part of side 21. The hook 8 engages by pressure with the trip hitch 25 in the closing phase of the mobile structure 19, with the fixed structure 1.

The hitch 25 operates so that at the first trip, the hook shaped body 8 engages in 26, whereas with a successive pressure it is released, passing underneath the raised tab 27. At the instant of engagement the mobile structure 19 is completely enclosed inside the box-like body 1, so that the equipment installed 23 is completely hidden and the front cover 12 closes. At the moment of release, the spring 9 pushes the mobile structure 19 outwards so that, together with the front part of the equipment 23 installed and with the relative controls, it protrudes from the front opening 22, while the cover 12 tilts downwards.

A spacer 28 may be applied to the front part of the box-like body 1 in the event equipment with protruding control knobs is installed.

The depth of the equipment is hence greater and the spacer compensates the need for a longer box-like body 1. With the possible addition of an adaptor ring, the totally hidden support, subject of this invention may be used for any type of equipment 23 manufactured at present, in compliance with current ISO and DIN standards. In the closed condition, only the cover 12 is visible on the dash-boards of vehicles, boats and the like being substantially rectangular and having the same shape and size of those used by vehicle manufacturers to cover the opening left for the installation of car radios and similar equipment. For greater security, the support subject of this invention may be fitted with a supplementary thief alarm consisting of an electro-magnetic latch 10.

The latch 10 is fixed to the internal surface of side 7 of the box-like body 1 and when activated, is fixed to the rear surface of side 21 of the mobile structure 19. The latch 10 may be controlled independently, or connected to any type of thief alarm that may be installed on vehicles, boats and the like.

With the latch 10 disengaged a slight pressure on the front cover 12 is sufficient to release the hook shaped body 8 from the trip hitch 25 and to make the equipment protrude from the dash-board opening where it is installed. To remove the equipment 23 it is sufficient to separate the lugs 13 of the front cover 12 from the levers 15, by extracting the pivot pins 14.

Thus, the mobile structure 19 may be extracted completely. Successively, the box-like body 1 may also be extracted by removing the fixing plates of known type.

From the illustration and description provided, it is clear that the invention is fundamentally characterised by a considerable functionality, great structural simplicity and easy assembly and disassembly, as also by a guarantee of security and sufficient economicity. This invention has been described with reference to the figures which represent a preferred, exemplificative, but non-limitative embodiment; it is obvious that modifications, changes and variations to the form and to the constituting parts may be made without leaving the protective sphere by so doing.

What I claim is:

1. A support for equipment of the type of car radios, cassette players, tuners and the like suitable for mounting firmly on the dashboard of a vehicle and the like, which comprises:

a box having a front wall, a bottom, a top, a rear wall and side walls, and being open at the front wall, means for anchoring said box to the dashboard of said vehicle, channels on said bottom and a hook protruding into the interior of said box from the rear wall, a mobile structure slidable in said box through said open front wall, said mobile structure carrying said equipment and consisting of a frame having a rear wall, side walls, a bottom and sliding ledges on said bottom, said ledges adapted to engage with said channels when the mobile structure is mounted within said box and when the rear wall of the mobile structure is aligned with the rear wall of the box, said mobile structure having a trip hitch, said trip hitch having a recess and a tab, said trip hitch extending from the rear wall of said mobile structure, for coupling with said hook which extends from said box when said hook engages with said recess and for uncoupling with said hook upon application of pressure whereby said hook slides on the surface of said tab, a front cover releasably hinged to the front wall of said box, said front cover having a pair of lugs pivoted on said ledges, a spring positioned between the rear wall of said box and the rear wall of said mobile structure, said spring being compressed therebetween when the mobile structure is mounted within the box and expanding and pushing the mobile structure outwardly when pressure is applied on the front cover and the mobile structure is released from the box, a pair of lever members pivoted on said lugs at one end and pivoted on said ledges of the mobile structure at the opposite end.

2. The support according to claim 1 wherein said trip hitch comprises a slanting plate provided with said recess, a second spring and a tab, said hook sliding in said recess when pressure is applied to mount said mobile structure within said box and when the mobile structure is released, said hook being placed on said tab.

3. The support, according to claim 1 wherein a spacer is applied in the front wall of the box to increase its depth.

4. The support, according to claim 1 wherein a thief alarm device consisting of an electro-magnetic latch is fixed to the interior surface of said rear wall of said box, said latch being engageable with said rear wall of the mobile structure.

5. The support according to claim 1 wherein when the mobile structure is mounted within said box, said front cover is closed and said equipment is hidden from view.

* * * * *

UNITED STATES PATENT AND TRADEMARK OFFICE
CERTIFICATE OF CORRECTION

PATENT NO. : 4,660,900

DATED : APRIL 28, 1987

INVENTOR(S) : ELIO PATERLINI

It is certified that error appears in the above-identified patent and that said Letters Patent is hereby corrected as shown below:

On the Title Page, Item [73] should read:

ASSIGNEE: AUTOSONIK S.P.A.

Signed and Sealed this

Twenty-fifth Day of August, 1987

*Attest:*

DONALD J. QUIGG

*Attesting Officer*     *Commissioner of Patents and Trademarks*